A. XANDER.
Sawing-Machines.

No. 141,975. Patented August 19, 1873.

Witnesses:
A. Bennenendorf.
C. Sedgwick.

Inventor:
A. Xander
Per
Attorneys.

UNITED STATES PATENT OFFICE.

ALLEN XANDER, OF SLATINGTON, PENNSYLVANIA.

IMPROVEMENT IN SAWING-MACHINES.

Specification forming part of Letters Patent No. 141,975, dated August 19, 1873; application filed June 7, 1873.

*To all whom it may concern:*

Be it known that I, ALLEN XANDER, of Slatington, in the county of Lehigh and State of Pennsylvania, have invented a new Improvement in Sawing-Machines, of which the following is a specification:

The invention consists in the improvement of sawing-machines, as hereinafter described and pointed out in the claim.

Figure 1:
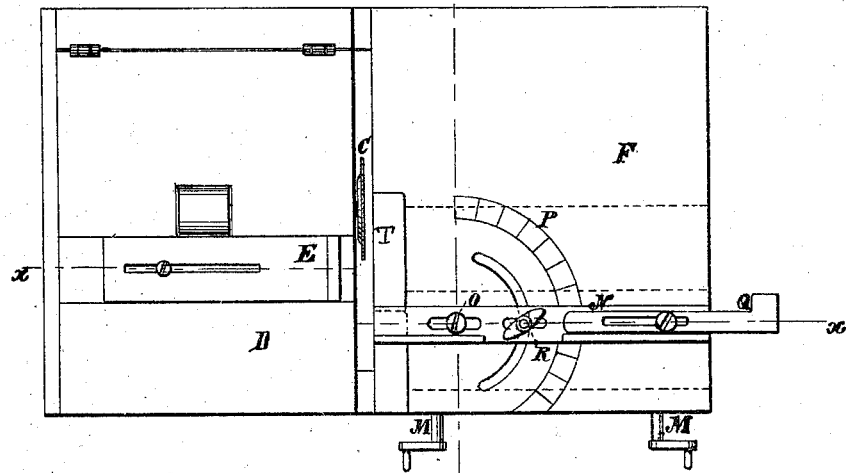
Figure 4:
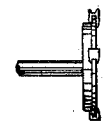
Figure 2:
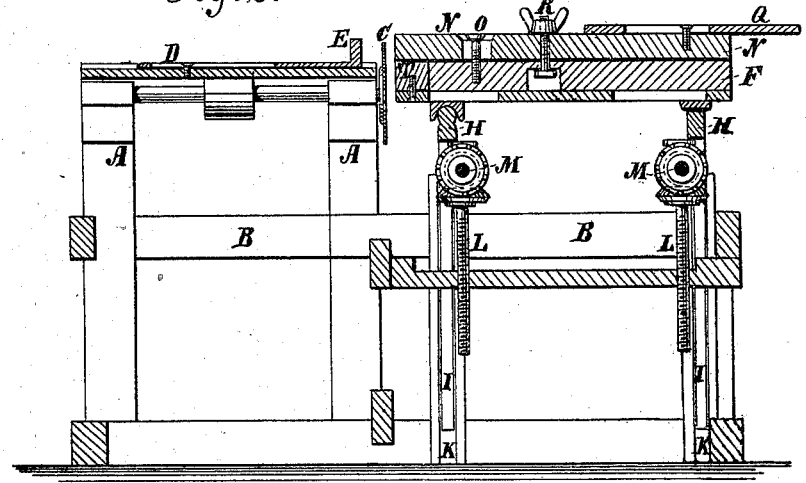
Figure 3:
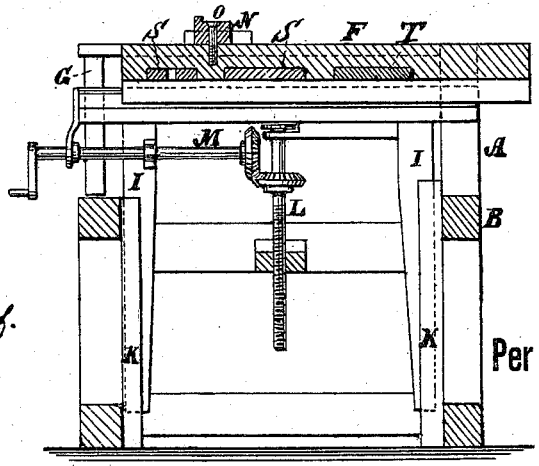

Figure 1 is a plan view of my improved machine. Fig. 2 is a transverse sectional elevation taken on the line $x\,x$ of Fig. 1. Fig. 3 is a transverse sectional elevation taken on the line $y\,y$ of Fig. 1; and Fig. 4 is a front elevation of a grooving-cutter to be used instead of the saw in some kinds of work.

The frame consists of a high part, A, and a low part, B. The saw C overhangs the high part on the same side that the low part B is. The saw-table D and its gage E on the high part of the table are similar to the ordinary ones, except that the table is hinged to the frame at the rear end, so as to swing over out of the way when it is desired to saw work on the other table F. The high part of the frame only extends forward as far as the saw-mandrel, so as to leave free space at the front and side of the saw for the projecting work on the table F, and the table D is supported at the front end by the short legs G extending down on the low part B of the former. The table F is mounted on ways H, to slide along the side of the saw for presenting the work to it, and these ways are mounted on vertically-sliding bars I arranged in the ways K, and provided with adjusting-screws L, which are turned by hand-crank shafts M gearing with them. By these devices the table is adjusted to any height desired by the nature of the work. The gage-bar N for controlling the work relatively to the saw is arranged on a pivot, O, so as to be shifted to any angle with the saw on which it may be desired to saw the work, and it is provided with a protracter-scale, P, by which to determine the angles, and it is also provided with an adjusting length-gage, Q. A clamp-screw, R, secures the gage when adjusted. This table F is provided with one or more boards, S T, &c., arranged to slide in and out of supports in the under side of it, to hold the work directly in front of the saw when it may be required to do so for cutting slots or notches in the end of the work. This tool may also be used for making long grooves in the work by running it over the cutter on the table F.

Having thus described my invention, I claim as new and desire to secure by Letters Patent—

The combination of the adjustable boards S T with the table F and the saw, substantially as specified.

ALLEN XANDER.

Witnesses:
D. D. ROPER,
DAVID McKENNA.